United States Patent
Chang et al.

(10) Patent No.: US 10,992,348 B1
(45) Date of Patent: Apr. 27, 2021

(54) NEAR FIELD COMMUNICATION ELECTRONIC BOLT

(71) Applicant: National Chung-Shan Institute of Science and Technology, Taoyuan (TW)

(72) Inventors: Feng-Yu Chang, Kaohsiung (TW); Yu-Cheng Chang, Changhua County (TW); Po-Chang Chen, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 16/729,496

(22) Filed: Dec. 30, 2019

(51) Int. Cl.
*G08B 21/00* (2006.01)
*H04B 5/00* (2006.01)
*G09F 3/03* (2006.01)

(52) U.S. Cl.
CPC ......... *H04B 5/0062* (2013.01); *G09F 3/0317* (2013.01); *G09F 3/0335* (2013.01); *H04B 5/0031* (2013.01); *H04B 5/0037* (2013.01); *H04B 5/0081* (2013.01); *H04B 5/0093* (2013.01)

(58) Field of Classification Search
CPC .. H04B 5/0062; H04B 5/0037; H04B 5/0093; H04B 5/0031; H04B 5/0081; G09F 3/0335; G09F 3/0317

USPC ..................................................... 340/572.8
See application file for complete search history.

(56) References Cited

U.S. PATENT DOCUMENTS

| | | | |
|---|---|---|---|
| 10,510,272 B1* | 12/2019 | Chen | E05B 39/005 |
| 2007/0103310 A1* | 5/2007 | Hopman | G06K 19/07758 340/572.8 |
| 2007/0139197 A1* | 6/2007 | Hopman | G06Q 10/08 340/572.1 |
| 2010/0171589 A1* | 7/2010 | Haberli | H04B 13/005 340/5.82 |
| 2012/0119975 A1* | 5/2012 | Lee | H01Q 1/2208 343/905 |
| 2014/0183266 A1* | 7/2014 | Lee | G06K 19/07758 235/492 |
| 2016/0168877 A1* | 6/2016 | Chen | G09F 3/0317 70/14 |

* cited by examiner

*Primary Examiner* — Mark S Rushing
(74) *Attorney, Agent, or Firm* — Winston Hsu

(57) ABSTRACT

An electronic bolt using wireless communication is disclosed and includes a bolt coil formed on a surface of the bolt circuit board, and configured to receive a wireless energy from an electronic seal; and a chip electrically connected to the bolt coil, and configure to generate a wireless signal containing a unique identification to the bolt coil when the chip is driven by the wireless energy; a holder configured to fix and support the bolt circuit board; and a bolt housing configured to contain the bolt circuit board and the holder; wherein the electronic bolt is locked or unlocked with the electronic seal when the unique identification is confirmed by the electronic seal.

13 Claims, 3 Drawing Sheets

NEAR FIELD COMMUNICATION ELECTRONIC BOLT

BACKGROUND OF THE INVENTION

1. Field of the Invention

The present invention relates to an electronic bolt, and more particularly, to a near field communication electronic bolt.

2. Description of the Prior Art

In the shipping industry, it is important to ensure the security of the containers and other conveyances. Therefore, various locks, seals, and other security devices and protocols are designed to attempt to stop the illegal shipment of goods. RFID (Radio Frequency Identification) technology is widely utilized in electronic locks, seals and bolts because an RFID chip is able to store and transmit a unique identification between the electronic locks, seals and bolts.

The electronic bolt for the container may be categorized into an active electronic bolt requiring dedicated power source and a passive electronic bolt without dedicated power source. The active electronic bolt has characteristics such as complex implementation, high production cost, reusability, and automatic breach detect and alert thanks to the dedicated power source. The passive electronic lock has characteristics such as simple implementation, low cost and disposability; in practice, the passive electronic lock is made by integrating an RFID chip into a mechanical bolt. However, the passive electronic bolt is unable to perform automatic breach detect and alert to cause security risk to the container. Further, the passive electronic bolt is not environmental friendly due to the disposability, and there are issues such as aging and poor water resistance.

Therefore, how to design a passive electronic bolt to reduce production cost, enable automatic security breach detect and alert, improve aging and water resistance, and be environmental friendly has become a topic in the shipping industry.

SUMMARY OF THE INVENTION

It is therefore an objective of the present invention to provide an electronic bolt using wireless communication.

The present invention discloses an electronic bolt using wireless communication. The electronic bolt includes a bolt circuit board including a bolt coil formed on a surface of the bolt circuit board, and configured to receive a wireless energy from an electronic seal; and a chip disposed on the surface of the bolt circuit board, electrically connected to the bolt coil, and configured to generate a wireless signal containing a unique identification to the bolt coil when the chip is driven by the wireless energy; a holder configured to fix and support the bolt circuit board; and a bolt housing configured to contain the bolt circuit board and the holder; wherein the electronic bolt is locked or unlocked with the electronic seal when the unique identification is confirmed by the electronic seal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
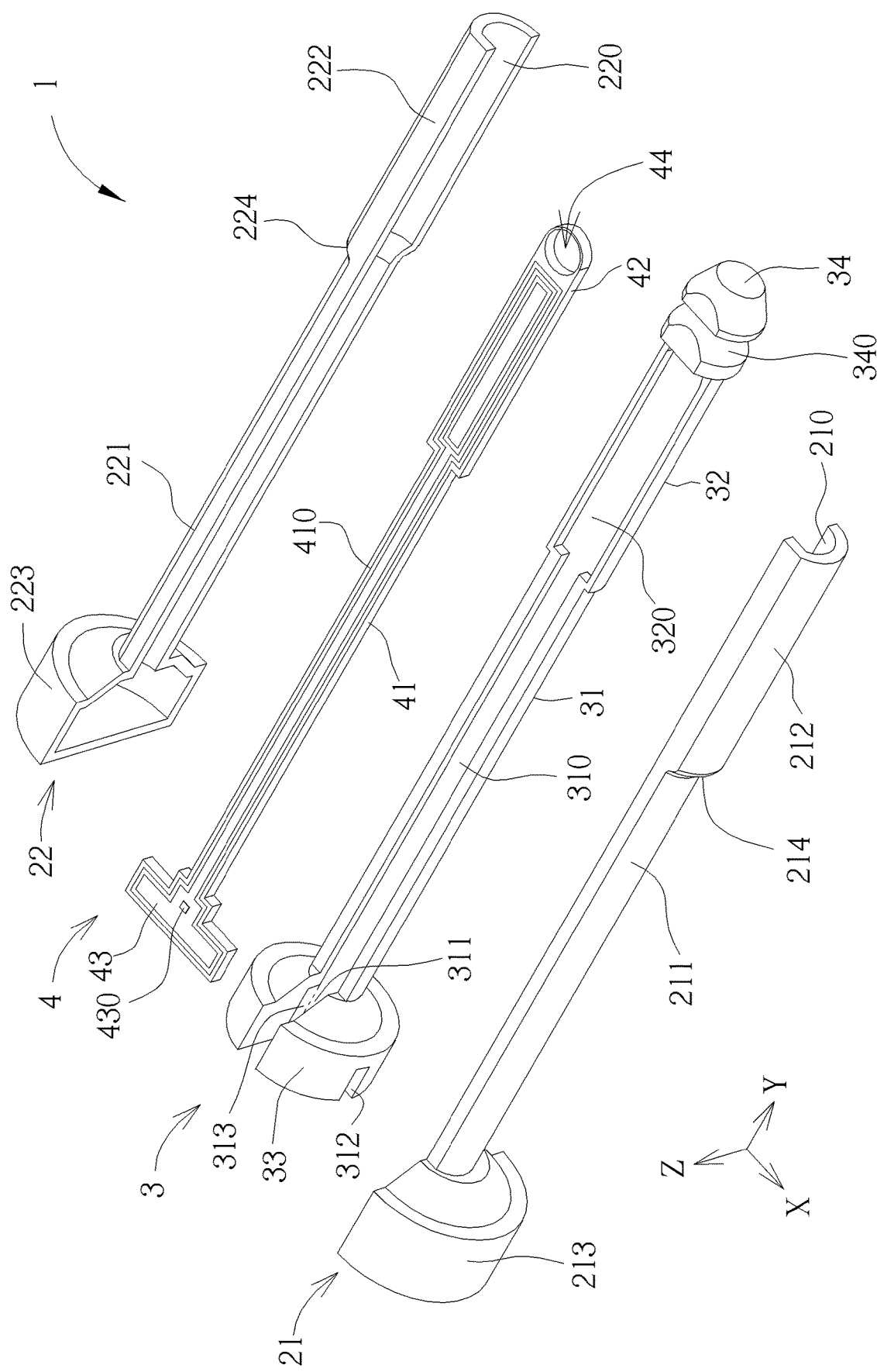
FIG. 1 illustrates an exploded view of an electronic bolt according to an embodiment of the present invention.

FIG. 1 illustrates an exploded view of an electronic bolt 1 according to an embodiment of the present invention. The electronic bolt 1 includes a bolt housing, a holder 3 and a bolt circuit board 4. The housing is configured to contain the holder 3 and the bolt circuit board 4, and the holder 3 is configured to fix and support the bolt circuit board 4.

The bolt housing includes a first casing 21 and a second casing 22, wherein the first casing 21 is formed with a first containing space 210, and the second casing 22 is formed with a second containing space 220, thereby the first containing space 210 and the second containing space 220 are able to contain the holder 3 when they are combined together. The first casing 21 includes a first casing shank 211, a first casing collar 212 and a first casing knob 213; and the second casing 22 includes a second casing shank 221, a second casing collar 222 and a second casing knob 223. The first casing shank 211 is connected between the first casing collar 212 and the first casing knob 213, and the second casing shank 221 is connected between the second casing collar 222 and the second casing knob 223. There is a first slope 214 between the first casing collar 212 and the first casing shank 211 to reduce abrasion between the electronic bolt 1 and any devices that may contact with the electronic bolt 1. Similarly, there is a second slope 224 between the second casing collar 222 and the second casing shank 221 to reduce abrasion between the electronic bolt 1 and any devices that may contact with the electronic bolt 1.

The holder 3 includes a holder shank 31, a holder collar 32, a holder knob 33, and a holder head 34. The holder shank 31 is connected between the holder collar 32 and the holder knob 33, and formed with a first groove 310. The holder collar 32 is connected between the holder shank 31 and the holder head 34, and formed with a second groove 320. The holder knob 33 is connected to one end of the holder shank 31, and formed with a first notch 311, a second notch 312 and the third notch 313. The first groove 310, the second groove 320 and the first notch 311 extend along a first direction Y, and the second notch 312 and the third notch 313 extend along a second direction X. The holder head 34 is formed with an annular notch 340 configured to be hooked or locked by an electronic seal when the bolt 1 is inserted into the electronic seal.

The bolt circuit board 4 includes a board shank 41, a board collar 42, and a board arm 43. The board shank 41 is connected between the board collar 42 and the board arm 43. A bolt coil 410 is formed on a top surface of the board shank 41, the board collar 42 and the board arm 43, and configured to transmit a unique identification carried by a wireless signal such as a wireless signal for near field communication. A chip 430 is disposed on the board arm 43, electrically connected to the bolt coil 410, and configured to generate the wireless signal containing the unique identification. The bolt coil 410 is further configured to store a wireless energy that is transmitted from the electronic seal, wherein the wireless energy is used to drive the chip 430. The board shank 41 and the board collar 42 extend along the first direction Y, and the board arm 43 extends along the second direction X.

An assembly process begins disposing the bolt circuit board 4 into the holder 3, and then enclosing the bolt circuit board 4 and the holder 3 in the first casing 21 and the second casing. In detail, the first groove 310 is configured to contain the board shank 41, the second groove 320 is configured to contain the board collar 42, the second notch 312 is configured to contain a portion of the board arm 43, and the third notch 313 is configured to contain another portion of the board arm 43. In one embodiment, the board collar 42 is formed with a board ring 44, and a rib (not shown in FIG. 1) extended a long a third direction Z is formed in the holder head 34, wherein the first direction Y, the second direction X and the third direction are perpendicular to each other. In such a structure, during the first step of the assembly process, an operator may place the board shank 41 into the first notch 311, move the bolt circuit board 4 along the first direction Y until the board arm 43 is fitted into the second notch 312 and the third notch 313, and fit the rib into the board ring 44, thereby the bolt circuit board 4 is fixed with the holder 3. Further, the first casing 211 and the second casing 221 do not enclose the holder head 34.

In one embodiment, the first casing 21 and the second casing 22 may be made of waterproof materials to protect the holder 3 and the bolt circuit board 4 from liquid (e.g., seawater or water vapor), which improves water resistance of the electronic bolt 1. The holder 3 may be made of metal (e.g., steel) to protect the bolt circuit board from deformation, which improves mechanical endurance of the electronic bolt 1.

Figure 2:
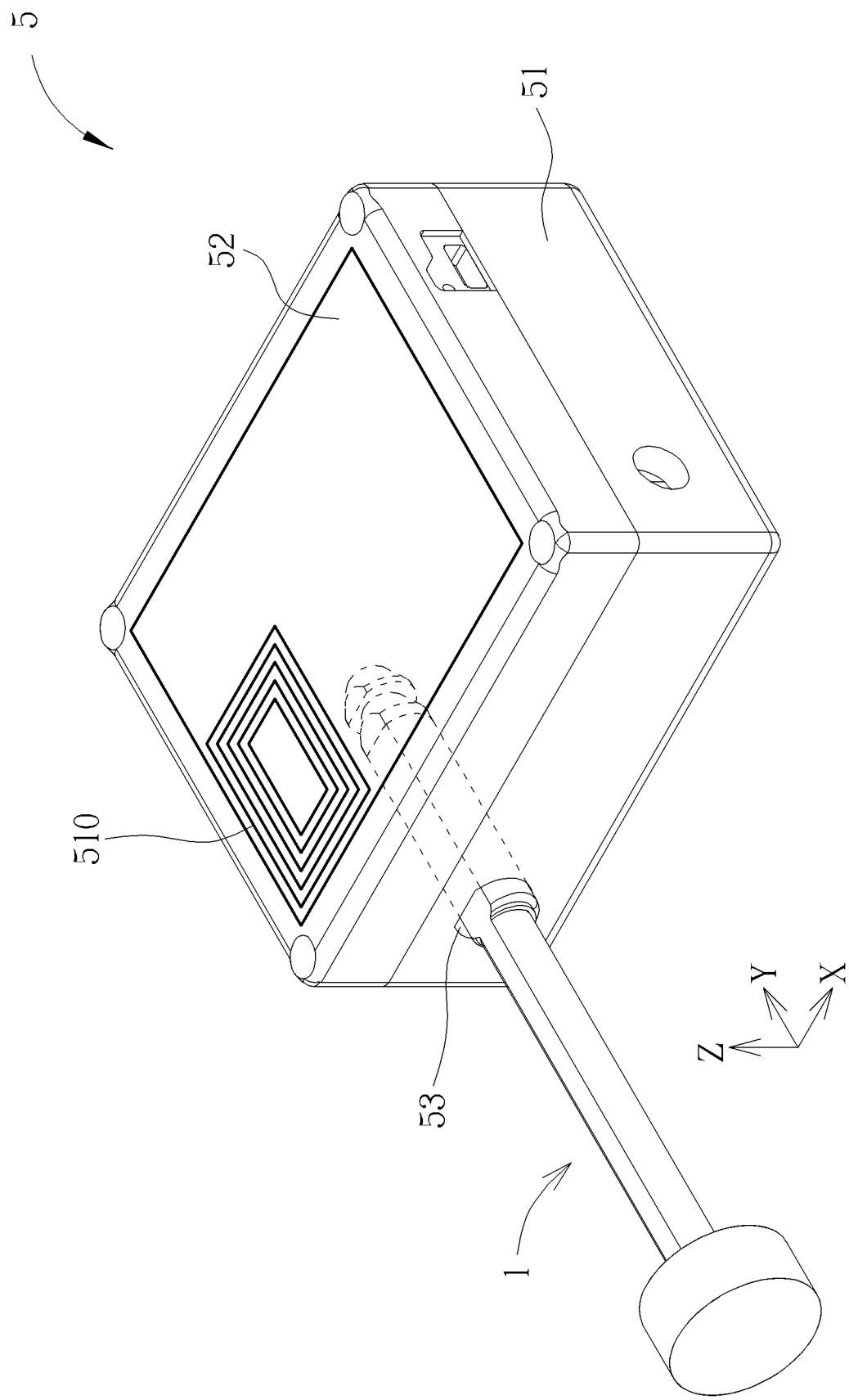
FIG. 2 illustrates an assembly diagram of the electronic bolt in FIG. 1 and an electronic seal according to an embodiment of the present invention.

FIG. 2 illustrates an assembly diagram of the electronic bolt 1 in FIG. 1 and an electronic seal 5 according to an embodiment of the present invention. The electronic seal 5 includes a seal housing 51, a seal circuit board 52, and a seal coil 510. The seal coil 510 is disposed on the seal circuit board 52, and configured to receive the wireless signal containing the unique identification. The seal circuit board 52 is disposed in the seal housing 51. A transmitter NFC chip (not shown in FIG. 2) is disposed on the seal circuit board 52, electrically connected to the seal coil 510, and configured to process the wireless signal received by the seal coil 510 to retrieve the unique identification of the electronic bolt 1. A seal hole 53 is formed in the seal housing 51, wherein the electronic bolt 1 can be inserted into the electronic seal 5 through the seal hole 53.

In one embodiment, the wireless signal is generated based on Near Field Communication (hereinafter abbreviated NFC), and the chip 430 is a receiver NFC chip. In detail, NFC is a wireless communication technology developed from a Radio-Frequency Identification (hereinafter abbreviated RFID) system to realize data exchange within a short distance. For example, using an Amplitude-Shift Keying (ASK) modulation with a carrier frequency of 13.56 MHz, a data rate of 106 k to 848 kbit/s can be reached, which realizes data exchange between two electronic devices such as the electronic bolt 1 and the electronic seal 5. The transmission distance for NFC is typically shorter than 10 centimeters and the transmission process is always monitored by an operator or a staff, therefore the transmitted data is difficult to be hacked, changed or damaged. In other words, the electronic bolt 1 and the electronic seal using NFC may improve security.

In operation of FIG. 2, when the electronic bolt 1 is inserted into the seal housing 51 of the electronic seal 5 through the hole 53, the bolt coil 410 of the electronic bolt 1 receives a first RF signal transmitted by the seal coil 52 of the electronic seal 5, the energy of the first RF signal is temporarily stored in order to drive the chip 430 of the electronic bolt 1 to retrieve the unique identification, the bolt coil 410 transmits a second RF signal containing the unique identification to the seal coil 52, and the electronic bolt 1 may be locked (or unlocked) with the electronic seal 5 when the unique identification is confirmed. In one embodiment, the NFC chip (not shown in FIG. 2) is electrically connected to a microcontroller unit (MCU) disposed on the seal circuit board 52, and configured to utilize a Universal Asynchronous Receiver/Transmitter (UART) interface to communicate with the microcontroller unit; for example, the NFC chip instructs the microcontroller unit to lock the electronic bolt 1 with the electronic seal 5 through the UART interface.

In the present invention, the electronic bolt 1 is able to communicate with the electronic seal 5 through wireless communication (e.g., NFC), which avoids malfunction due to poor electrical contact between the bolt and the seal in the prior art. Moreover, NFC has many characteristics that is suitable for the present invention such as low power consumption, short distance communication, and one-to-one communication, which reduces the risk of being hacked during communication to improve confidentiality and security.

Figure 3:
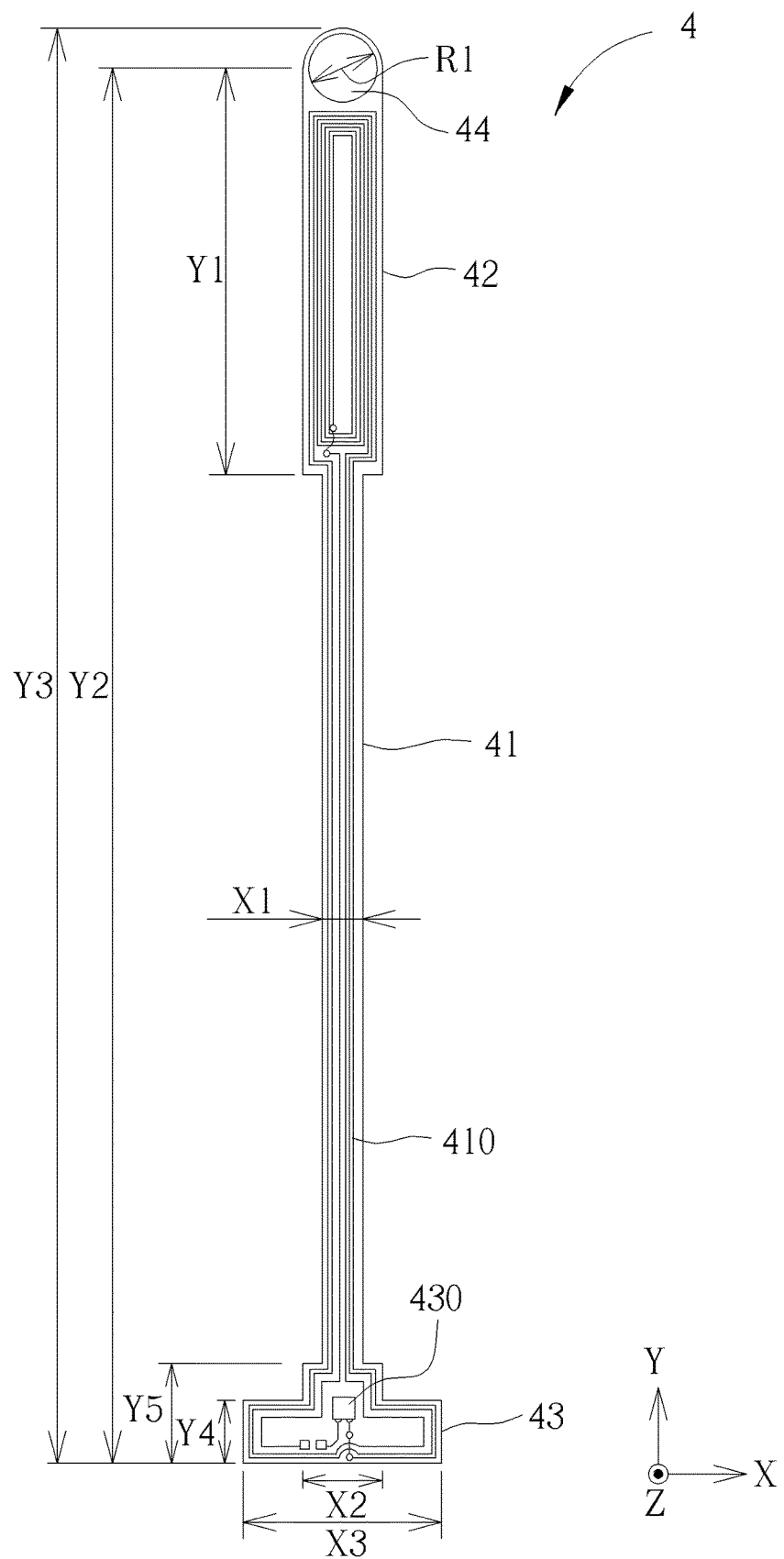
FIG. 3 illustrates a top view of the circuit board in FIG. 1 according to an embodiment of the present invention.

FIG. 3 illustrates a top view of the circuit board 4 according to an embodiment of the present invention. As shown in FIG. 3, along the first direction Y, a size Y1 of the board collar 42 may be substantially 33.1 millimeters, a size Y2 from the center of the board ring 44 to the bottom of the circuit board 4 may be substantially 109.2 millimeters, a size Y3 from the top to the bottom of the circuit board 4 may be substantially 112.2 millimeters, a size Y4 corresponding a portion of the board arm 43 that is fitted into the second notch 312 and the third notch 313 may be substantially 4.9 millimeters, and a size Y5 from the board shank 41 to the bottom of the board arm 43 may be substantially 7.7 millimeters. Along the second direction X, a size X1 of the board shank 41 may be substantially 3.2 millimeters, a size X2 of a portion of the board arm 43 that is fitted into the first notch 311 may be substantially 6 millimeters, and a size X3 of a maximum width of the board arm 43 may be substantially 15.4 millimeters. A diameter R3 of the board ring 44 may be substantially 5.4 millimeters. Note that the sizes Y1, Y2, Y3, Y4, Y5, X1, X2, X3 and R3 may be adjusted based on practical requirements, which are not limited in the present invention. As can be seen from FIG. 3, along the second direction X, the maximum width X3 of the circuit board 43 is 15.4 millimeters, and the minimum width X1 of the circuit board 43 is 3.2 millimeters, it is crucial to design the pattern of the bolt coil 410 that is able to operate NFC within the limited space.

Further, it is found that a security breach could be made by removing the knob of the electronic bolt to take off the bolt from the seal in the prior art. In order to alert this kind of security breach to the staff, the security breach can be indicated by detecting a response (or presence) from the chip 430 of the electronic bolt 1; for example, the chip 43 of the electronic bolt 1 has no response once any trace of the bolt coil 410 is broken. As shown in FIG. 3, the chip 430 is encircled by the bolt coil 410 and placed within the knob of the electronic bolt 1, and thus the security breach can be detected once any damage is made to the knob of the electronic bolt 1 (e.g., the chip 430 has no response once any trace of the bolt coil 430 is broken, or the chip 430 is absent once the knob of the electronic bolt 1 is removed).

To sum up, the present invention provides the electronic bolt using wireless communication (e.g., NFC) to avoid poor electrical contact between the bolt and the seal. Moreover, the present invention provides the bolt coil pattern in order to operate wireless communication and enable automatic security breach detect and alert. Further, the present invention provides the mechanical structure of the electronic bolt for abrasion reduction, fix and support, thereby the electronic bolt of the present invention is reusable and environmental friendly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic bolt using wireless communication, comprising:
    a bolt circuit board, comprising:
        a bolt coil formed on a surface of the bolt circuit board, and configured to receive a wireless energy from an electronic seal; and
        a chip disposed on the surface of the bolt circuit board, electrically connected to the bolt coil, and configured to generate a wireless signal containing a unique identification to the bolt coil when the chip is driven by the wireless energy;
    a holder configured to fix and support the bolt circuit board; and
    a bolt housing configured to contain the bolt circuit board and the holder;
    wherein the electronic bolt is locked or unlocked with the electronic seal when the unique identification is confirmed by the electronic seal.

2. The electronic bolt of claim 1, wherein the bolt circuit board comprises:
    a board shank extending along a first direction;
    a board collar extending along the first direction; and
    a board arm extending along a second direction, wherein board shank is connected between the board collar and the board arm, the chip is disposed on the board arm, and the first direction is perpendicular to the second direction.

3. The electronic bolt of claim 2, wherein the holder comprises:
    a holder shank extending along the first direction, and formed with a first groove configured to contain a portion of the board shank;
    a holder collar extending along the first direction, and formed with a second groove configured to contain the board collar;
    a holder knob, wherein the holder shank is connected between the holder collar and the holder knob; and
    a holder head, wherein the holder collar is connected between the holder shank and the holder head.

4. The electronic bolt of claim 3, wherein the holder knob is connected to one end of the holder shank, and formed with:
    a first notch extending along the first direction, and configured to contain another portion of the board shank;
    a second notch extending along the second direction, and configured to contain a portion of the board arm; and
    a third notch extending along the second direction, and configured to contain another portion of the board arm.

5. The electronic bolt of claim 3, wherein the holder head is formed with an annular notch configured to be hooked or locked by the electronic seal when the electronic bolt is inserted into the electronic seal.

6. The electronic bolt of claim 3, wherein the bolt housing comprises:
    a first casing comprising a first casing shank, a first casing collar and a first casing knob; and
    a second casing comprising a second casing shank, a second casing collar and a second casing knob;
    wherein when the first casing and the second casing are combined together:
        the first casing shank and the second casing shank are configured to contain the holder shank and board shank;
        the first casing collar and the second casing collar are configured to contain the holder collar and board collar; and
        the first casing knob and the second casing knob are configured to contain the holder knob and board arm.

7. The electronic bolt of claim 6, wherein the bolt housing comprises:
    a first slope formed between the first casing collar and the first casing shank; and
    a second slope formed between the second casing collar and the second casing shank.

8. The electronic bolt of claim 6, wherein the first casing and the second casing do not enclose the holder head.

9. The electronic bolt of claim 3, wherein the board collar is formed with a board ring, and a rib extended a long a third direction is formed in the holder head, and the rib is fitted into the board ring when the bolt circuit board is fixed with the holder, wherein the first direction, the second direction and the third direction are perpendicular to each other.

10. The electronic bolt of claim 1, wherein the chip is encircled by the bolt coil.

11. The electronic bolt of claim 1, wherein along a first direction, a size of the circuit board is substantially 110 millimeters to 120 millimeters.

12. The electronic bolt of claim 11, wherein along a second direction, a size of the circuit board is substantially 15 millimeters to 16 millimeters.

13. The electronic bolt of claim 1, wherein the chip is a near field communication chip configured to perform near field communication with the electronic seal.

* * * * *